US009589289B2

(12) United States Patent
Leahy et al.

(10) Patent No.: US 9,589,289 B2
(45) Date of Patent: Mar. 7, 2017

(54) PRIORITIZATION OF THIRD PARTY ACCESS TO AN ONLINE COMMERCE SITE

(71) Applicant: PayPal, Inc., San Jose, CA (US)

(72) Inventors: Scott Leahy, San Jose, CA (US); Alon Cohen, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 411 days.

(21) Appl. No.: 14/231,569

(22) Filed: Mar. 31, 2014

(65) Prior Publication Data

US 2014/0215069 A1 Jul. 31, 2014

Related U.S. Application Data

(63) Continuation of application No. 13/566,919, filed on Aug. 3, 2012, now Pat. No. 8,793,375, which is a
(Continued)

(51) Int. Cl.
*G06F 15/173* (2006.01)
*G06Q 30/06* (2012.01)
(Continued)

(52) U.S. Cl.
CPC ......... *G06Q 30/0613* (2013.01); *G06Q 30/06* (2013.01); *H04L 29/06* (2013.01); *H04L 47/70* (2013.01); *H04L 67/02* (2013.01); *H04L 67/1008* (2013.01); *H04L 67/1014* (2013.01); *H04L 67/142* (2013.01); *H04L 67/20* (2013.01); *H04L 67/2814* (2013.01); *H04L 67/1002* (2013.01); *H04L 67/1023* (2013.01); *H04L 69/329* (2013.01); *H04L 2029/06054* (2013.01)

(58) Field of Classification Search
CPC ........... H04L 12/2458; H04L 29/12952; H04L 63/10; H04L 67/2852
USPC ........ 709/219, 225, 238, 245, 200; 718/105; 719/328, 329; 705/14.51
See application file for complete search history.

(56) References Cited

U.S. PATENT DOCUMENTS 3,573,747 A  4/1971  Adams et al.
3,581,072 A  5/1971  Nymeyer
(Continued)

FOREIGN PATENT DOCUMENTS

CA  2253543 A1  3/1997
EP  0817444 A2  1/1998
(Continued)

OTHER PUBLICATIONS

U.S. Appl. No. 14/453,945, filed Aug. 7, 2014, System and Method to Facilitate Different Item Viewing Based on Preferred Status.
(Continued)

*Primary Examiner* — El Hadji Sall
(74) *Attorney, Agent, or Firm* — Maschoff Brennan

(57) ABSTRACT

Providing prioritization of user online access to an online commerce site. Third party applications using API function calls to access an online commerce site are restricted to specific services by an access rule. An access rule defines which API server on the online commerce site a specific third party application may access when using a specific API function call. In this way, the operator of the online commerce site may prioritize server access per service level agreements based on a specific third party application and API function call.

20 Claims, 5 Drawing Sheets

Related U.S. Application Data continuation of application No. 13/307,625, filed on Nov. 30, 2011, now Pat. No. 8,239,533, which is a continuation of application No. 11/924,362, filed on Oct. 25, 2007, now Pat. No. 8,108,518, which is a continuation of application No. 10/025,267, filed on Dec. 18, 2001, now Pat. No. 7,305,469.

(51) Int. Cl.
    *H04L 29/06*     (2006.01)
    *H04L 29/08*     (2006.01)
    *H04L 12/911*     (2013.01)

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,774,664 A | 6/1998 | Hidary et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,974,412 A | 10/1999 | Hazlehurst et al. |
| 5,991,739 A | 11/1999 | Cupps et al. |
| 6,021,438 A | 2/2000 | Duvvoori et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,047,322 A | 4/2000 | Vaid et al. |
| 6,055,518 A | 4/2000 | Franklin et al. |
| 6,058,417 A | 5/2000 | Hess et al. |
| 6,061,448 A | 5/2000 | Smith et al. |
| 6,073,109 A | 6/2000 | Flores et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,161,139 A | 12/2000 | Win et al. |
| 6,163,796 A | 12/2000 | Yokomizo |
| 6,178,408 B1 | 1/2001 | Copple et al. |
| 6,182,142 B1 | 1/2001 | Win et al. |
| 6,186,886 B1 | 2/2001 | Farrington et al. |
| 6,189,033 B1 | 2/2001 | Jin et al. |
| 6,192,407 B1 | 2/2001 | Smith et al. |
| 6,202,051 B1 | 3/2001 | Woolston |
| 6,243,691 B1 | 6/2001 | Fisher et al. |
| 6,285,989 B1 | 9/2001 | Shoham |
| 6,430,607 B1 | 8/2002 | Kavner |
| 6,453,353 B1 | 9/2002 | Win et al. |
| 6,609,112 B1 | 8/2003 | Boarman et al. |
| 6,615,253 B1 | 9/2003 | Bowman-Amuah |
| 6,738,815 B1 | 5/2004 | Willis, Jr. et al. |
| 6,760,775 B1 | 7/2004 | Anerousis et al. |
| 6,947,977 B1 | 9/2005 | Kley |
| 6,968,390 B1 | 11/2005 | Chavez, Jr. |
| 7,100,195 B1 | 8/2006 | Underwood |
| 7,185,070 B2 | 2/2007 | Paul et al. |
| 7,185,364 B2 | 2/2007 | Knouse et al. |
| 7,305,469 B2 | 12/2007 | Leahy et al. |
| 8,108,518 B2 | 1/2012 | Leahy et al. |
| 8,239,533 B2 | 8/2012 | Leahy et al. |
| 8,793,375 B2 | 7/2014 | Leahy et al. |
| 8,918,505 B2 | 12/2014 | Leahy et al. |
| 2001/0023421 A1 | 9/2001 | Numao et al. |
| 2001/0044787 A1 | 11/2001 | Shwartz et al. |
| 2001/0051980 A1 | 12/2001 | Raciborski et al. |
| 2002/0032837 A1 | 3/2002 | Larson et al. |
| 2002/0069279 A1 | 6/2002 | Romero et al. |
| 2002/0087707 A1 | 7/2002 | Stewart et al. |
| 2002/0091802 A1 | 7/2002 | Paul et al. |
| 2002/0174421 A1 | 11/2002 | Zhao et al. |
| 2003/0033205 A1 | 2/2003 | Nowers et al. |
| 2003/0105849 A1* | 6/2003 | Iwamoto ............... G06F 21/604 709/223 |
| 2004/0158502 A1 | 8/2004 | Adams et al. |
| 2004/0205243 A1 | 10/2004 | Hurvig et al. |
| 2004/0236648 A1 | 11/2004 | Yip et al. |
| 2005/0192958 A1 | 9/2005 | Widjojo et al. |
| 2005/0246187 A1 | 11/2005 | Maltzman |
| 2005/0262194 A1 | 11/2005 | Mamou et al. |
| 2006/0059107 A1 | 3/2006 | Elmore et al. |
| 2006/0059253 A1 | 3/2006 | Goodman et al. |
| 2008/0046279 A1 | 2/2008 | Leahy et al. |
| 2008/0072311 A1 | 3/2008 | Mullick et al. |
| 2012/0079114 A1 | 3/2012 | Leahy et al. |
| 2012/0297065 A1 | 11/2012 | Leahy et al. |
| 2014/0214613 A1 | 7/2014 | Leahy et al. |
| 2014/0215067 A1 | 7/2014 | Leahy et al. |
| 2014/0215068 A1 | 7/2014 | Leahy et al. |
| 2014/0215070 A1 | 7/2014 | Leahy et al. |
| 2014/0344113 A1 | 11/2014 | Maltzman |
| 2014/0350969 A1 | 11/2014 | Maltzman |

(56) References Cited

U.S. PATENT DOCUMENTS

FOREIGN PATENT DOCUMENTS

| | | | |
|---|---|---|---|
| EP | 0862105 | A2 | 9/1998 |
| FR | 2658635 | A1 | 8/1991 |
| KR | 20000036643 | | 7/2000 |
| KR | 20010079045 | | 8/2001 |
| KR | 20010095998 | | 11/2001 |
| NL | 9300266 | A | 9/1994 |
| WO | WO-9215174 | A1 | 9/1992 |
| WO | WO-9517711 | A1 | 6/1995 |
| WO | WO-9634356 | A1 | 10/1996 |
| WO | WO-9710655 | A1 | 3/1997 |
| WO | WO-9737315 | A1 | 10/1997 |
| WO | WO-9963461 | A1 | 12/1999 |
| WO | WO-0114990 | A1 | 3/2001 |
| WO | WO-0182023 | A2 | 11/2001 |
| WO | WO-0186395 | A2 | 11/2001 |
| WO | WO-03052615 | A1 | 6/2003 |

OTHER PUBLICATIONS

U.S. Appl. No. 14/454,032, filed Aug. 7, 2014, System and Method to Provide Altered Benefit Based on Preferred Status.
"U.S. Appl. No. 10/837,147, Non Final Office Action mailed Sep. 28, 2015", 26 pgs.
"Canada Application Serial No. 2,824,037, Office Action mailed Oct. 5, 2015", 4 pgs.
"U.S. Appl. No. 10/837,147, Response filed Jan. 28, 2016 to Non Final Office Action mailed Sep. 28, 2015", 20 pgs.
"U.S. Appl. No. 14/453,945, Non Final Office Action mailed Jan. 21, 2016", 26 pgs.
"U.S. Appl. No. 14/454,032, Non Final Office Action mailed Jan. 22, 2016", 23 pgs.
"U.S. Appl. No. 14/231,268, Preliminary Amendment filed Jun. 4, 2014", 7 pgs.
"U.S. Appl. No. 10/837,147, Response filed May 30, 2014 to Final Office Action mailed Apr. 11, 2014", 14 pgs.
"U.S. Appl. No. 14/231,234, Notice of Allowance mailed Aug. 19, 2014", 9 pgs.
"U.S. Appl. No. 14/231,234, Preliminary Amendment filed Jun. 4, 2014", 7 pgs.
"U.S. Appl. No. 14/231,359, Preliminary Amendment filed Jun. 4, 2014", 7 pgs.
"U.S. Appl. No. 14/231,601, Preliminary Amendment filed Jun. 4, 2014", 7 pgs.
"U.S. Appl. No. 14/453,945, Preliminary Amendment filed Aug. 12, 2014", 6 pgs.
"U.S. Appl. No. 14/454,032, Preliminary Amendment filed Aug. 12, 2014", 6 pgs.
"Canadian Application Serial No. 2,824,037, Office Action mailed Jul. 17, 2014", 2 pgs.
"Canadian Application Serial No. 2,824,037, Response filed Jan. 16, 2015", 8 pgs.
"European Application Serial No. 13163818.1, Extended European Search Report mailed Jul. 24, 2014", 6 pgs.
"European Application Serial No. 13163818.1, Response filed Jun. 12, 2015", 5 pgs.
U.S. Appl. No. 10/837,147, filed Apr. 30, 2004, System and Method to Facilitate Differentiated Levels of Service in a Network-Based Marketplace.
U.S. Appl. No. 14/231,234, filed Mar. 31, 2014, Prioritization of Third Party Access to an Online Commerce Site.
U.S. Appl. No. 13/566,919, filed Aug. 3, 2012, Prioritization of Third Party Access to an Online Commerce Site.
U.S. Appl. No. 14/231,601, filed Mar. 31, 2014, Prioritization of Third Party Access to an Online Commerce Site.
U.S. Appl. No. 14/231,268, filed Mar. 31, 2014, Prioritization of Third Party Access to an Online Commerce Site.
U.S. Appl. No. 14/231,359, filed Mar. 31, 2014, Prioritization of Third Party Access to an Online Commerce Site.
"U.S. Appl. No. 10/025,267, 312 Amendment filed Aug. 28, 2007", 13 pgs.
"U.S. Appl. No. 10/025,267, Final Office Action mailed Apr. 18, 2006", 7 pgs.
"U.S. Appl. No. 10/025,267, Non Final Office Action mailed Sep. 22, 2005", 8 pgs.
"U.S. Appl. No. 10/025,267, Non Final Office Action mailed Oct. 5, 2006", 7 pgs.
"U.S. Appl. No. 10/025,267, Notice of Allowance mailed Jul. 25, 2007", 6 pgs.
"U.S. Appl. No. 10/025,267, PTO Response to 312 Amendment mailed Sep. 12, 2007", 2 pgs.
"U.S. Appl. No. 10/025,267, Response filed Jan. 24, 2006 to Non Final Office Action mailed Sep. 22, 2005", 19 pgs.
"U.S. Appl. No. 10/025,267, Response filed Apr. 5, 2007 to Non Final Office Action mailed Oct. 5, 2006", 18 pgs.
"U.S. Appl. No. 10/025,267, Response filed Jul. 14, 2005 to Restriction Requirement mailed Jun. 30, 2005", 15 pgs.
"U.S. Appl. No. 10/025,267, Response filed Jul. 18, 2006 to Final Office Action mailed Apr. 18, 2006", 15 pgs.
"U.S. Appl. No. 10/025,267, Restriction Requirement mailed Jun. 30, 2005", 5 pgs.
"U.S. Appl. No. 10/837,147, Advisory Action mailed Apr. 29, 2010", 3 pgs.
"U.S. Appl. No. 10/837,147, Final Office Action mailed Jan. 25, 2010", 23 pgs.
"U.S. Appl. No. 10/837,147, Final Office Action mailed Apr. 11, 2014", 22 pgs.
"U.S. Appl. No. 10/837,147, Final Office Action mailed Dec. 9, 2010", 20 pgs.
"U.S. Appl. No. 10/837,147, Non Final Office Action mailed Sep. 11, 2013", 20 pgs.
"U.S. Appl. No. 10/837,147, Non-Final Office Action mailed Jun. 24, 2010", 24 pgs.
"U.S. Appl. No. 10/837,147, Non-Final Office Action mailed Jul. 10, 2009", 15 pgs.
"U.S. Appl. No. 10/837,147, Non-Final Office Action mailed Dec. 11, 2008", 19 pgs.
"U.S. Appl. No. 10/837,147, Response filed Feb. 9, 2011 to Final Office Action mailed Dec. 9, 2010", 16 pgs.
"U.S. Appl. No. 10/837,147, Response filed Mar. 11, 2009 to Non-Final Office Action mailed Dec. 11, 2008", 15 pgs.
"U.S. Appl. No. 10/837,147, Response filed Mar. 24, 2010 to Final Office Action mailed Jan. 25, 2010", 12 pgs.
"U.S. Appl. No. 10/837,147, Response filed Sep. 17, 2010 to Non Final Office Action mailed Jun. 24, 2010", 18 pgs.
"U.S. Appl. No. 10/837,147, Response filed Oct. 12, 2009 to Non Final Office Action mailed Jul. 10, 2009", 12 pgs.
"U.S. Appl. No. 10/837,147, Response filed Dec. 11, 2013 to Non Final Office Action mailed Sep. 11, 2013", 14 pgs.
"U.S. Appl. No. 11/924,362, Corrected Notice of Allowability mailed Dec. 8, 2011", 4 pgs.
"U.S. Appl. No. 11/924,362, Examiner Interview Summary mailed Jun. 30, 2010", 2 pgs.
"U.S. Appl. No. 11/924,362, Final Office Action mailed Mar. 4, 2011", 14 pgs.
"U.S. Appl. No. 11/924,362, Non-Final Office Action mailed Jul. 13, 2010", 15 pgs.
"U.S. Appl. No. 11/924,362, Notice of Allowance mailed Oct. 6, 2011", 7 pgs.
"U.S. Appl. No. 11/924,362, Preliminary Amendment filed Jun. 22, 2010", 7 pgs.
"U.S. Appl. No. 11/924,362, Response filed Jul. 5, 2011 to Final Office Action mailed Mar. 4, 2011", 11 pgs.
"U.S. Appl. No. 11/924,362, Response filed Dec. 13, 2010 to Non Final Office Action mailed Jul. 13, 2010", 10 pgs.
"U.S. Appl. No. 11/924,362, Response to Rule 312 mailed Dec. 27, 2011", 1 pg.
"U.S. Appl. No. 11/924,362, Supplemental Amendment filed Nov. 9, 2011", 7 pgs.

(56) References Cited

OTHER PUBLICATIONS

"U.S. Appl. No. 11/924,362, Supplemental Response filed Sep. 21, 2011 to Final Office Action mailed Mar. 4, 2011", 12 pgs.
"U.S. Appl. No. 13/307,625, Notice of Allowance mailed Apr. 6, 2012", 14 pgs.
"U.S. Appl. No. 13/307,625, Preliminary Amendment Filed Mar. 6, 2012", 6 pgs.
"U.S. Appl. No. 13/566,919, Examiner Interview Summary mailed Jun. 21, 2013", 2 pgs.
"U.S. Appl. No. 13/566,919, Non Final Office Action mailed Nov. 26, 2012", 6 pgs.
"U.S. Appl. No. 13/566,919, Notice of Allowance mailed Mar. 14, 2014", 5 pgs.
"U.S. Appl. No. 13/566,919, Notice of Allowance mailed Apr. 12, 2013", 6 pgs.
"U.S. Appl. No. 13/566,919, Notice of Allowance mailed Aug. 9, 2013", 6 pgs.
"U.S. Appl. No. 13/566,919, Notice of Allowance mailed Nov. 27, 2013", 7 pgs.
"U.S. Appl. No. 13/566,919, Response filed Mar. 26, 2013 to Non Final Office Action mailed Nov. 26, 2012", 8 pgs.
"Austrailian Application Serial No. 2002357254, Notice of Acceptance mailed Nov. 24, 2008", 3 pgs.
"Australian Application Serial No. 2002357254, First Examiner's Report mailed Nov. 26, 2007", 2 pgs.
"Australian Application Serial No. 2002357254, Response filed Nov. 4, 2008 to Office Action mailed Nov. 24, 2007", 32 pgs.
"Canadian Application Serial No. 2,469,655, Office Action mailed Mar. 4, 2009", 4 pgs.
"Canadian Application Serial No. 2,469,655, Response filed Jul. 30, 2009 to Office Action mailed Mar. 4, 2009", 5 pgs.
"Canadian Application Serial No. 2469655, Notice of Allowance mailed Jan. 7, 2010", 1 pg.
"Chinese Application Serial No. 02825513.5, First Office Action mailed May 18, 2007", with English translation of claims, 12 pgs.
"Chinese Application Serial No. 02825513.5, Response filed Oct. 8, 2007 to Office Action mailed May 18, 2007", 13 pgs.
"Chinese Application Serial No. 200710301613.9, Notice of Reexamination mailed Jun. 5, 2012", with English translation., 8 pgs.
"Chinese Application Serial No. 200710301613.9, Office Action mailed Sep. 13, 2010", 10 pgs.
"Chinese Application Serial No. 200710301613.9, Office Action received May 25, 2011", with English translation of claims, 26 pgs.
"Chinese Application Serial No. 200710301613.9, Response filed Jan. 25, 2011 to Non Final Office Action mailed Sep. 13, 2010", with English translation of claims, 21 pgs.
"Chinese Application Serial No. 200710301613.9, Response filed Sep. 9, 2011 to Office Action mailed May 25, 2011", 13 pgs.
"Chinese Application Serial No. 200710301614.3, Notice of Reexamination mailed Jun. 14, 2012", with English translation., 11 pgs.
"Chinese Application Serial No. 200710301614.3, Office Action mailed Sep. 13, 2010", with English translation of claims, 9 pgs.
"Chinese Application Serial No. 200710301614.3, Reexamination Decision mailed Mar. 29, 2013", with English summary from Associate., 11 pgs.
"Chinese Application Serial No. 200710301614.3, Response filed Jan. 25, 2011 to Non Final Office Action mailed Sep. 13, 2010", with English translation of claims, 10 pgs.
"Chinese Application Serial No. 200710301614.3, Response filed Jul. 29, 2012 to Notice of Reexamination mailed Jun. 14, 2012", with English translation of claims.
"Chinese Application Serial No. 200710301614.3, Response filed Sep. 28, 2012 to Office Action mailed Jun. 14, 2012", with English translation of claims, 23 pgs.
"Chinese Application Serial No. 200710301614.3, Office Action mailed Mar. 23, 2011", with English translation of claims, 12 pgs.
"European Application Serial No. 02805161.3, Office Action mailed Apr. 5, 2011", 7 pgs.
"European Application Serial No. 02805161.3, Office Action Response filed Oct. 17, 2011", 5 pgs.

"European Application Serial No. 02805161.3, Supplemental European Search Report mailed Dec. 17, 2010", 6 pgs.
"International Application Serial No. PCT/US02/40146, International Preliminary Examination Report mailed Oct. 10, 2003", 12 pgs.
"International Application Serial No. PCT/US02/40146, International Search Report mailed Mar. 7, 2003", 6 pgs.
"International Application Serial No. PCT/US02/40146, Written Opinion mailed Jul. 8, 2003", 12 pgs.
"Korean Application Serial No. 2004-7009430, Answer and Preparatory Precept mailed Feb. 27, 2009", with English translation, 69 pgs.
"Korean Application Serial No. 2004-7009430, Court Decision mailed Sep. 11, 2009", with English translation, 17 pgs.
"Korean Application Serial No. 2004-7009430, Final Office Action mailed Jan. 11, 2008", 4 pgs.
"Korean Application Serial No. 2004-7009430, Non-Final Office Action mailed Sep. 10, 2007", 20 pgs.
"Korean Application Serial No. 2004-7009430, Response filed Feb. 11, 2008", 63 pgs.
"Korean Application Serial No. 2004-7009430, Response filed Nov. 6, 2007", 56 pgs.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail debuts with week-long charity auction for The Computer Museum in Boston", Business Wire, Dialog Web. 0489267 BW0022, (May 24, 1995), 3 pgs.
Baumann, G. W, "Personal Optimized Decision/Transaction Program", IBM Technical Disclosure Bulletin, (Jan. 1995), 83-84.
Business Wire, "Mediappraise Receives National Award for Web-based Technology That Enables Companies to Solve Thorny HR Problem", Business Wire, (Dec. 14, 1998), 1-2.
Clemons, E., "Evaluating the prospects for alternative electronic securities", Proceedings of ICIS 91: 12th International Conference on Information Systems, (Dec. 16-18, 1991), 53-63.
ePier.com, "ePier.com Guidelines", Auctions, [Online]. Retrieved from the Internet: <URL: http://www.wpier.com/Guidelines.asp>, (Mar. 9, 2001), 9 pages.
Graham, Ian, "The Emergence of Linked Fish Markets in Europe", Electronic Markets. vol. 8, No. 2, (1998), 29-32.
Hauser, R., "Anonymous Delivery of Goods in Electronic Commerce", IBM Technical Disclosure Bulletin, 39(3), (Mar. 1996), 363-366.
Hess, C. M, et al., "Computerized Loan Organization System: An Industry Case Study of the Electronic Markets Hypothesis", MIS Quarterly, vol. 18(3), (Sep. 1994), 251-275.
Klein, Stefan, "Introduction to Electronic Auctions", Focus Theme, vol. 7, No. 4, (1997), 3-6.
Lee, H. G, "Electronic brokerage and electronic auction: the impact of IT on market structures", Proceedings of the Twenty-Ninth Hawaii International Conference on System Sciences, vol. 4, (1996), 397-406.
Lee, Ho Geun, "AUCNET: Electronic Intermediary for Used-Car Transactions", Focus Theme, Electronic Markets, vol. 7, No. 4, (1997), 24-28.
Malone, T., et al., "Electronic Markets and Electronic Hierarchies", Communications of the ACM, vol. 30, No. 6, (Jun. 1987), 484-497.
Mardesich, Jodi, "Site Offers Clearance for End-of-Life Products—Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb. 1994), 39-50.
Meade, J., "Visual 360: A Performance Appraisal System That's 'Fun'", HR Magazine, Society for Human Resource Management., (Jul. 1999), 3 pgs.
Neo, B. S, "The implementation of an electronic market for pig trading in Singapore", Journal of Strategic Information Systems; vol. 1(5), (Dec. 1992), 278-288.

(56) References Cited

OTHER PUBLICATIONS

Post, D. L, et al., "Application of auctions as a pricing mechanism for the interchange of electric power", IEEE Transactions on Power Systems, 10(3), (Aug. 1995), 1580-1584.

Preist, Chris, et al., "Adaptive Agents in a Persistent Shout Double Auction", International Conference on Information and Computation Economies, Proceedings of the first international conference on Information and computation economies, (1998), 11-18.

Reck, M., "Formally Specifying an Automated Trade Execution System", The Journal of Systems and Software, 1993, Elsevier Science Publishing, USA, (1993), 245-252.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Rockoff, T. E, et al., "Design of an Internet-based system for remote Dutch auctions", Internet Research: Electronic Networking Applications and Policy, vol. 5(4), (Jan. 1, 1995), 10-16.

Schmid, B. F, "The Development of Electronic Commerce", EM—Electronic Markets, No. 9-10, (Oct. 1993), 2 pgs.

Siegmann, Ken, "Nowhere to go but up", PC Week; vol. 12(42), Ziff-Davis Publishing Company, (Oct. 23, 1995), 1-3.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, (1996), 6 pgs.

Warbelow, A, et al., "Aucnet: TV Auction Network System", Harvard Business School Case/Study, HBVR#9-190-001, USA, (Jul. 1989), 1-16.

Yahoo! Auctions, "Options", [Online]. Retrieved from the Internet: <URL: http://user.auctions.yahoo.com.../prefs?.done+list.auctions.yahoo.com>, (2001), 2 pgs.

Zwass, V., "Electronic Commerce: Structures and Issues", International Journal of Electronic Commerce, Fall 1996, vol. 1, No. 1, (Fall 1996), 3-23.

\* cited by examiner

PRIORITIZATION OF THIRD PARTY ACCESS TO AN ONLINE COMMERCE SITE

CROSS-REFERENCE TO RELATED APPLICATIONS

This application is a continuation of U.S. application Ser. No. 13/566,919, filed Aug. 3, 2012, which application is a continuation of U.S. application Ser. No. 13/307,625, filed Nov. 30, 2011, issued as U.S. Pat. No. 8,239,533, which application is a continuation of U.S. application Ser. No. 11/924,362, filed on Oct. 25, 2007, issued as U.S. Pat. No. 8,108,518, which is a continuation of U.S. application Ser. No. 10/025,267, filed on Dec. 18, 2001, issued as U.S. Pat. No. 7,305,469, which applications are incorporated in their entirety herein by reference.

BACKGROUND OF THE INVENTION

Field of the Invention

The invention relates to the field of network computing. More specifically, the invention relates to the prioritization of third party access to an online commerce site.

Background of the Invention

The online commerce marketplace allows users to buy and sell goods and services (e.g., via an online auction web site) to geographically dispersed consumers. Typically, a user employs automated processes to buy or sell their own products on the online commerce site. By partnering with an established online commerce site, a user (e.g., a merchant) bypasses the cost of building an online commerce infrastructure from scratch, thereby reaching the online market quickly and accessing a large number of good and services in addition to a large number of buyers and sellers.

Permitting uncontrolled access to the online commerce site has some drawbacks, such as the drain on system resources due to the increased processing performed on the online commerce site. For example, a third party may utilize an automated program to extract information such as product listings and pricing information, from the online commerce site at various unpredictable times. The automated program may place a heavy load on the online commerce site that causes substantial response time delays to all users of the online commerce site. These response time delays may eventually frustrate the consumers of the site, causing them to cease using the online commerce site and seek another electronic commerce site from which to conduct business.

BRIEF SUMMARY OF THE INVENTION

Providing prioritization of user online access to an online commerce site. Third party applications using API function calls to access an online commerce site are restricted to specific services by an access rule. An access rule defines which API server on the online commerce site a specific third party application may access when using a specific API function call. In this way, the operator of the online commerce site may prioritize server access per service level agreements based on a specific third party application and API function call.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Prioritization of user online access to an online commerce site is described. According to one embodiment, an online commerce merchant configures an access rule to prioritize third party online access. An access rule defines how a third party may access the online commerce site. For example, a user may be limited, with an access rule, to a specific service on a specific server on the online commerce site, thereby, providing predictability to the operator of an online commerce site as to user accesses the online commerce site. In this way, the operator of an online commerce site may negotiate a service level agreement to provide access to specific servers with predetermined service levels as will be further described below.

Figure 1:
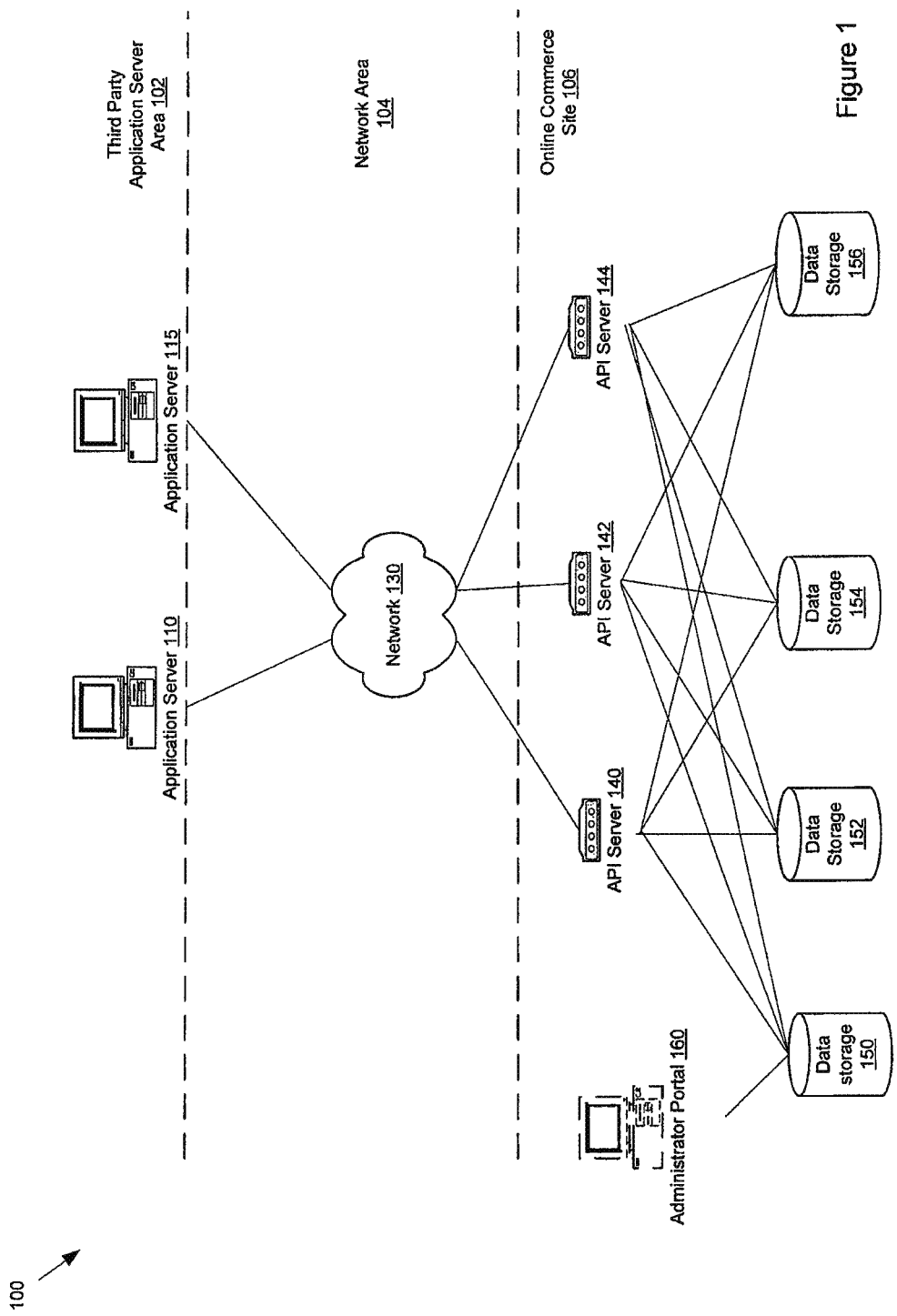
FIG. 1 illustrates an online commerce system according to one embodiment.

FIG. 1 illustrates an online commerce 100 system according to one embodiment. A third party server area 102, a network area 104, and online commerce site 106, partitions the online commerce system 100.

The third party server area 102 includes third party application servers 110 and 115. The online commerce area 106 includes Application Program Interface (API) servers 140, 142, and 144, and data storage devices 150, 152, 154, and 156. Any of the API servers 140, 142, and 144 may access any of the data storage devices 150, 152, 154, and 156. The network area 104 includes a network 130 (e.g., the Internet). The network 130 provides connectivity between any of the third party application servers 110 and 115 in the third party server area 102 and any of the API servers 140, 142, and 144 of the online commerce site 106. Access by the third party application servers 110, 115 may be prioritized based on a service level agreement, across the multiple API servers 140, 142, 144, as will be further described below.

Generally, third party developers create applications on the third party application servers 110 and 115 to access information and services available in the online commerce site 106 in a client/server type environment. For example, where the online commerce site 106 operates as an online auction site, the online auction site may store pricing and product information in the data storage devices 150, 152, 154, and 156. The application hosted by the third party application server 110, 115 may use a HTML form or CGI program using the standard XML (eXtensible Markup Language) data format, and may be written in C++, Perl, Pascal, or any other programming language capable of issuing data requests via the network 100 (e.g., the Internet). In one embodiment, each third party application hosted by the third party application servers 110, 115 uses APIs (application programming interfaces) to access the services provided by the online commerce site 106. In general, APIs are standard programming interfaces (i.e., contracts) that define the input and output of function calls published by the online commerce site 106 to third party software programmers to automate access to services on the online commerce site 106 efficiently via application programs (e.g., to create an application to conduct auctions, and to manage auction and user information).

In one embodiment, a third party application must obtain access rule(s) before accessing the services on the online commerce site 106. For example, an access rule may include a URL (uniform resource locator) that addresses the API server 140, 142, or 144, with which the third party application 110 and 115 is to connect (or communicate) when accessing the services of the online commerce site 106. In this way, the URL directs a specific user to a specific API server on the online commerce site 106 per the service level agreement. The access rule may also be configured to direct a specific user to a specific API server having a different service level based on the specific API function call to be used. For example, the third party application server 110 may be directed (via a URL stored in an access rule) to connect to API server 140 when servicing a "GetItem" API function call to retrieve information describing an item offered for sale via the online commerce site 106.

The access rule(s) are configured on the online commerce site 106. For example, an administrator of the online commerce site 106 may configure access rules stored in the data storage device 150 via the administrator portal 160. In one embodiment, each rule has a record in a database table that corresponds to one API function call type. Specifically, the table includes a field for a Rule_ID, an APP_ID, a CallName, and a URL for each API function call. The Rule_ID field stores an identifier for a specific rule. The App_ID field stores the identifier of the third party application. The CallName field stores the name of an API function call. The URL field stores the URL that the third party application should use when utilizing the API function call associated with the CallName. In this way, the administrator configures each access rule per the service level agreement to an API function used by a specific third party application to connect (via a given URL) to a specific API server. The access rule may also include rate usage information that limits third party application access as will be further described below.

In one embodiment, the access rule(s) are resident on the third party application server before the third party application accesses the services of the online commerce site 106. The third party application may request the access rule(s) from the online commerce site 106 using an API function call as will be further described below.

It should be appreciated that in this way, the online commerce merchant may prioritize access of third party application servers 110 and 115 to API servers 140, 142, 144 on the online commerce site 106. For example, the online commerce merchant may negotiate to provide a premium service level (e.g., guarantee faster response time) to third party application server 110 and provide a standard service level to the third party application server 115. The API server 142 may be designated as a premium server (for example, because a minimum number of third party applications have access to the API server 142, the API server 142 has additional resources and services available, among other examples), while the API server 144 may be designated as a standard server. Therefore, an access rule associated with an application on the third party application server 110 defines connectivity to the API server 142 for the premium service requests and an access rule associated with an application on the third party application server 115 defines connectivity to the API server 144 for the standard server requests.

A third party application may schedule the request for access rule(s) on a periodic basis (e.g., nightly). In this way, the third party application may receive any access rule updates performed by the administrator after analyzing the usage pattern of all third party applications. Continuing the example, if it is determined that the response time provided by the premium service on the API server 142 is not acceptable, then an administrator may modify the appropriate access rule to redirect the third party application server 110 to connect to a premium service on the API server 144 instead of connecting to API server 142 as previously defined.

Figure 2:
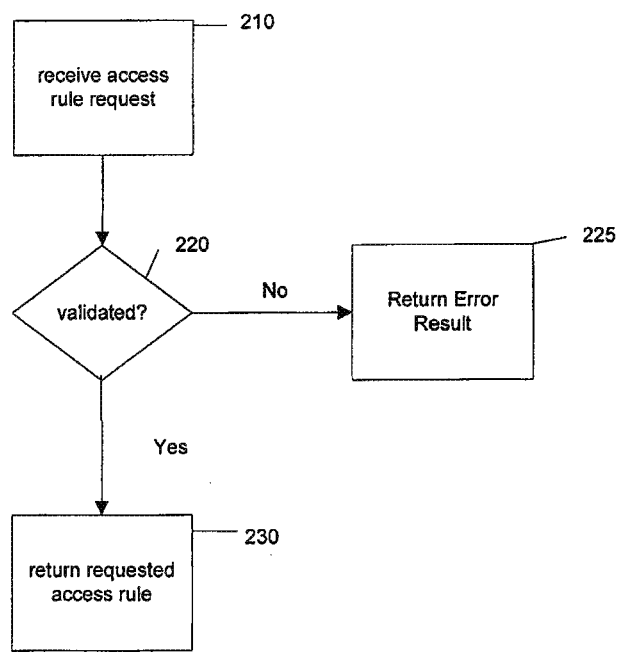
FIG. 2 is a flow diagram illustrating access rule processing on an online commerce site according to one embodiment.

FIG. 2 is a flow diagram illustrating access rule processing on the online commerce site 106 according to one embodiment.

At block 210, the API server 140 receives a request for an access rule from a third party application. As stated above, the request may originate from an API function call. In one embodiment, the function call request is passed from a third party application to the online commerce server 106 via a URL request string. By using a URL request string, through the HTTP transport protocol, to make the API function call the API function is rendered-platform independent. Therefore, the third party application may be on any Internet capable machine including Microsoft Windows, Unix, Linux, or Macintosh computer, among others.

At decision block 220, the API server 140 determines whether the request is a valid. In one embodiment, the request includes an application identifier, a developer identifier, and a session certificate. The application identifier identifies the third party application that transmitted the request. In one embodiment, a session certificate is a string of characters unique to a third party application. The session certificate string for the third party application is passed along with the developer identifier and the application identifier for each API function call type and is used by the API server 140, 142, and 144 to validate the request.

At block 225, the request is not validated and a descriptive message of the error result is returned back to the requesting third party application.

At block 230, if the third party application request is validated, the access rule(s) for the predefined service levels for the identified third party application are returned to the requesting third party application. For example, the API server 140 may access an access rules database table on the data storage device 150 for all the access rules associated with the application identifier of the request. Each access rule to be returned to the requesting third party application includes a CallName and a URL that the third party application should use when making a API function call associated with the CallName, as will be further described. In this way, the third party application will be directed to the API server 140, 142, 144 providing the appropriate service level.

Figure 3:
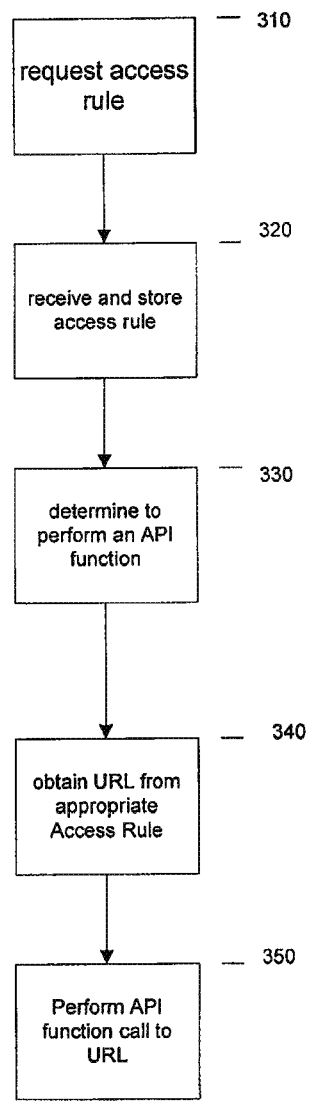
FIG. 3 is a flow diagram illustrating a process of using access rules on a third party application server according to one embodiment.

FIG. 3 is a flow diagram illustrating a process of using access rules on a third party application server according to one embodiment. At block 310, the third party application makes a request for access rules to an API server. The request may be made to a predefined API Server or to any of the API Servers on the online commerce site 106.

At block 320, the third party application receives the appropriate access rules. Upon receiving an access rule, the third party application saves the access rule in a data store such as a storage device, a memory, and a database, for example.

At block 330, the third party application intends to perform an API function call to the online commerce site 106. Examples of API functions for an online auction site include: an AddItem function (sends a request to the online commerce site to put an item up for auction), a GetItem function (used to query the online commerce site and retrieve the information for one auction item); a GetSellerList function (queries the online commerce site and retrieves a list of the items a specific user/merchant is selling); a GetSearchResults (searches for items on the online commerce site); among other examples. Further examples of APIs to access an online auction site are described in the patent application entitled "Method and Apparatus to Facilitate a Transaction within a Network-Based Auction Facility", Ser. No. 09/999,618, Assigned to eBay, Inc.

At block 340, the URL from the access rule associated with intended API function call is obtained. The URL is retrieved from the access rule in the data store having a CallName associated to the intended API function call. Again, the URL may direct the user to the API server servicing the negotiated service level.

At block 350, upon obtaining the appropriate URL, the third party application applies the intended API function call to the appropriate API server on the online commerce site 106.

Figure 4:
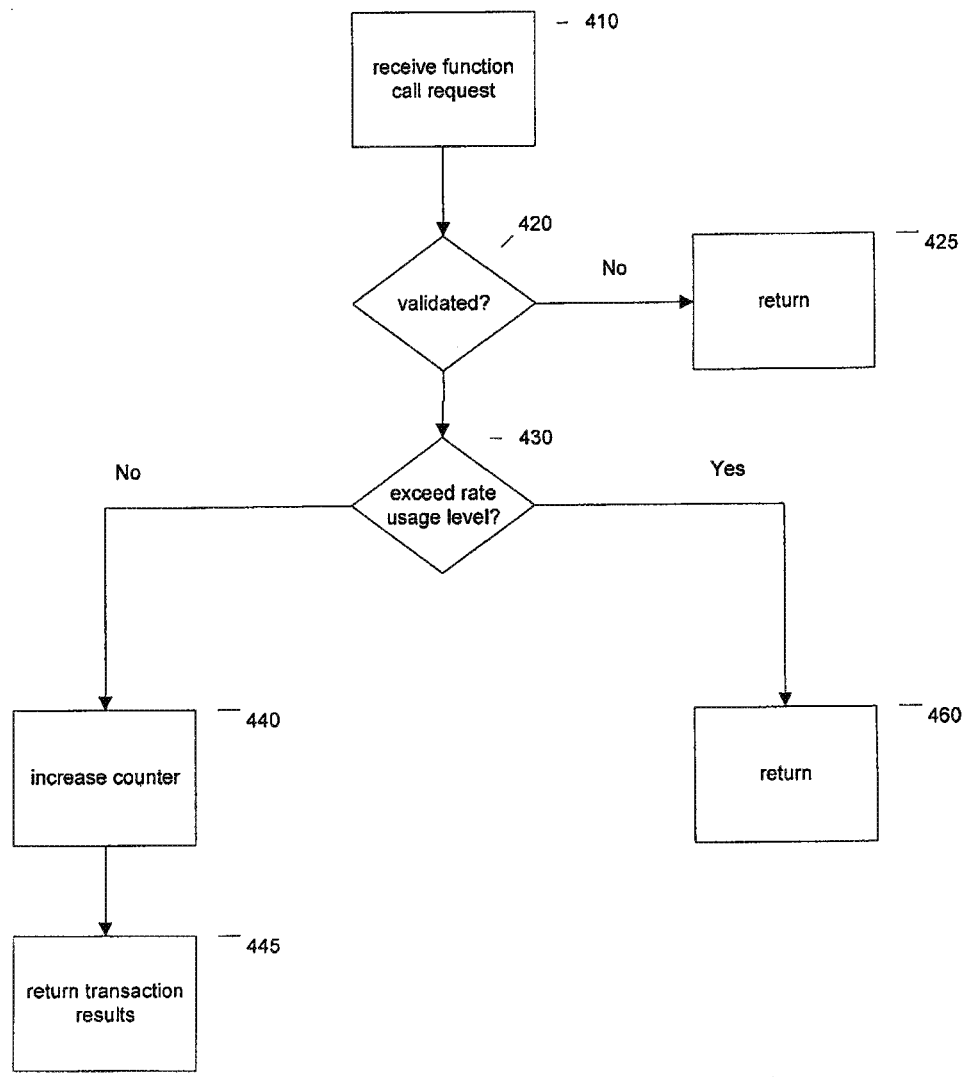
FIG. 4 illustrates a flow diagram of one embodiment of using access rules and rate usage limits on an online commerce server.

FIG. 4 illustrates a flow diagram of one embodiment of using access rules and rate usage limits on an online commerce site. At block 410, an API server 140-144 receives a request to access the services on the online commerce site 106. As stated above, the request may for example be an API function call for a list of seller items (e.g., GetSellerItemList API function).

At decision block 420, a validation is performed on the request. If the request is validated, control passes to block 425. If the request is not validated, control passes to block 430. The application identifier, developer identifier, or session certificate, or any combination thereof, included in an API function call header, may be used to validate the request based on the associated (or matching) access rule stored on the online commerce site 106.

Validation may also include determining whether the requesting API function call is to the appropriate API server. The third party application may connect to API server to which it has been assigned in the access rule. Continuing the example, if the access rule for the third party application server 115 defines the GetItemList API function to be made to API server 142 (via the URL stored in the access rule associated with the GetitemList API function), then a validating API server will validate that a request is made to the appropriate API server 142.

At block 425, the request is not validated and a descriptive message is returned back to the requesting third party application.

At block 430, the appropriate API server determines whether the third party application has exceeded a predefined maximum rate usage level. For example, the administrator may limit the third party application to perform a certain number of transactions per unit of time (e.g., 80,000 searches per day). If the third party application has exceeded the maximum rate usage, control passes to block 460. If the third party application has not exceeded the maximum rate usage, control passes to block 440. In this way, block 430 operates like a circuit breaker to limit third party access if it exceeds the agreed-upon transaction limits.

In another embodiment, block 430 may determine whether the third party application has exceeded other predefined maximum rate usage levels, such as, the maximum number of calls within a predefined time frame (e.g., per day, per hour), the maximum number of simultaneous calls, whether the call is during a predefined time of day, among other examples.

At block 440, the third party application has not exceeded the maximum rate usage level, therefore, the API function call is performed, and if necessary, a usage rate counter increased. Continuing the example, the number of transaction results performed may be added to the maximum rate usage counter for the specific third party application. The maximum rate usage counter value may be stored in memory of the API server or in one of the databases 150, 152, 154, and 156.

At block 445, the API server returns the transaction results up to the maximum rate usage level. Therefore, if the third party application reaches the maximum rate usage upon performing the requested transaction, only those transactions that are below the maximum rate usage level are transmitted to the third party application. Control then passes to block 445.

At block 460, the third party application has exceeded the maximum rate usage and a descriptive message is returned back to the requesting third party application.

Figure 5:
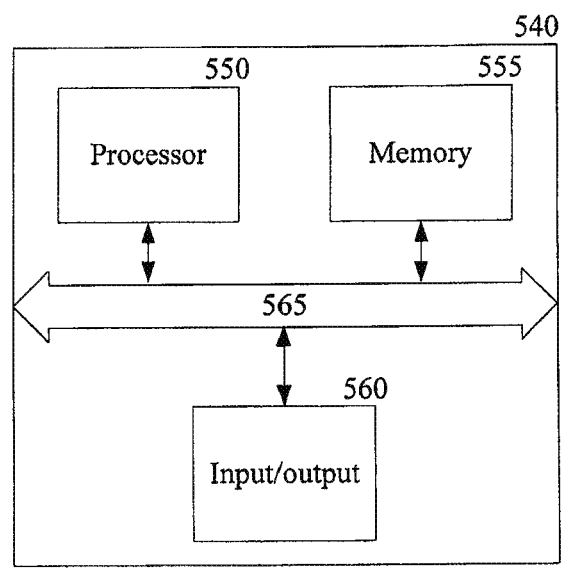
FIG. 5 depicts an exemplary computer system suitable for practicing the present invention.

One embodiment of an API server suitable for managing access rules is illustrated in FIG. 5. The computer system 540 includes a processor 550, memory 555 and input/output capability 560 coupled to a system bus 565. The memory 555 is configured to store instructions which, when executed by the processor 550, perform the methods described herein. The memory 555 may also store access rules. Input/output 560 provides for the delivery and display of software to a device and allows for the modification of the access rules thereof. Input/output 560 also encompasses various types of machine-readable media, including any type of storage device (e.g., preference database 240) that is accessible by the processor 550. The description of FIG. 5 is intended to provide an overview of computer hardware and other operating components suitable for implementing the invention, but is not intended to limit the applicable environments. It will be appreciated that the computer system 540 is one example of many possible computer systems, which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network. It will be appreciated that more or fewer processes may be incorporated into the method illustrated in FIGS. 2 and 3 without departing from the scope of the invention and that no particular order is implied by the arrangement of blocks shown and described herein. It further will be appreciated that the method described in conjunction with FIGS. 2 and 3 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The method may be provided as a computer program product that may include a machine-readable medium having stored thereon instructions, which may be used to program a computer (or other electronic devices) to perform the method. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and a carrier wave that encodes a data signal. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

It should be appreciated that by providing third party applications access rules to determine which API server to access, the online commerce merchant may prioritize and control the manner in which the third party applications access the online commerce site 106. The online commerce site 106 may prioritize access by class of customer or service being accessed when needed to achieve any necessary service level. In this way, premium services may be provided to specific third party applications thereby guaranteeing availability of services on the premium site, among other advantages.

In addition, only those third party applications and API function calls that have the appropriate access rule may access the API server, thereby preventing other parties from sharing services by using a specific URL assigned to another third party application. Also, since a single third party application may access different API servers based on the specific API function call, the invention also prevents the third party user from arbitrary selecting any one of the API servers.

Although the exemplary embodiment of described herein details how an online auction merchant prioritizes third party application requests from API function calls with access rules, it should be understood that the invention is not limited to prioritizing third party application's access to an online auction site. Alternatively, an access rule may be used to prioritize access to alternative online commerce environments and to alternative services provided by an online commerce facility.

Although the invention describes how a third party application connects to an API server, in alternative embodiments, the third party application connects to an API server pool (e.g., multiple API servers) that are controlled by a resonate load balancer and respond to the same URL. Load balancing network topologies are well know in the art and have not been described in detail in order not to obscure the invention.

It is also understood that access rules may be delivered to a third party application server via means other than the API function described. In alternative embodiments, the access rules may be transferred to the third party application server by other well-known file transfer mechanisms within the scope of the invention. In addition, in some embodiments the access rules are preemptively not transferred to the third party application server but the third party application server searches access rules on the online commerce site before performing a specific API function to determine which API server to connect when accessing the online commerce site 106.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method comprising:
   requesting, by a machine having a memory and at least one processor, an access rule from a server, the server being one of a plurality of servers of a network-based site providing services, the plurality of servers including a plurality of application programming interface (API) servers configured to service API function calls received from a client, each API function call comprising a service request for a corresponding one of the services of the network-based site;
   receiving the access rule, the access rule indicating a specific one of the plurality of API servers to be used for accessing one of the services of the network-based site; and submitting an API function call for one of the services of the network-based site using the received access rule.

2. The method of claim 1, wherein the access rule comprises a uniform resource locator (URL) of the specific one of the plurality of API servers.

3. The method of claim 1, further comprising storing the access rule in a data store.

4. The method of claim 3, further comprising obtaining the access rule from the data store prior to submitting the API function call.

5. The method of claim 1, wherein subsequent requests for the access rule from the server are performed on a periodic basis.

6. The method of claim 1, wherein the network-based site comprises an online commerce site.

7. The method of claim 1, wherein the network-based site comprises a services-based site.

8. The method of claim 1, wherein the API function call comprises a request to transact an item, a request to retrieve information for an item, a request to retrieve a list of items a specific user is selling, or a request to search for items.

9. A system comprising:
   a machine having a memory and at least one processor; and an application on the machine and executable by the at least one processor, the application being configured to:
   request an access rule from a server, the server being one of a plurality of servers of a network-based site providing services, the plurality of servers including a plurality of application programming interface (API) servers configured to service API function calls received from a client, each API function call comprising a service request for a corresponding one of the services of the network-based site;
   receive the access rule, the access rule indicating a specific one of the plurality of API servers to be used for accessing one of the services of the network-based site; and
   submit an API function call for one of the services of the network-based site using the received access rule.

10. The system of claim 9, wherein the access rule comprises a uniform resource locator (URL) of the specific one of the plurality of API servers.

11. The system of claim 9, wherein the application is further configured to store the access rule in a data store.

12. The system of claim 11, wherein the application is further configured to obtain the access rule from the data store prior to submitting the API function call.

13. The system of claim 9, wherein subsequent requests for the access rule from the server are performed on a periodic basis.

14. The system of claim 9, wherein the network-based site comprises an online commerce site.

15. The system of claim 9, wherein the network-based site comprises a services-based site.

16. The system of claim 9, wherein the API function call comprises a request to transact an item, a request to retrieve information for an n item, a request to retrieve a list of items a specific user is selling, or a request to search for items.

17. A non-transitory machine-readable storage medium, tangibly embodying a set of instructions that, when executed by at least one processor, causes the at least one processor to perform a set of operations comprising:

requesting, by a machine having a memory and at least one processor, an access rule from a server, the server being one of a plurality of servers of a network-based site providing services, the plurality of servers including a plurality of application programming interface (API) servers configured to service API function calls received from a client, each API function call comprising a service request for a corresponding one of the services of the network-based site;

receiving the access rule, the access rule indicating a specific one of the plurality of API servers to be used for accessing one of the services of the network-based site;

and submitting an API function call for one of the services of the network-based site using the received access rule.

18. The non-transitory machine-readable storage medium of claim 17, wherein the access rule comprises a uniform resource locator (URL) of the specific one of the plurality of API servers.

19. The non-transitory machine-readable storage medium of claim 17, wherein the set of operations further comprises storing the access rule in a data store.

20. The non-transitory machine-readable storage medium of claim 19, wherein the set of operations further comprises obtaining the access rule from the data store prior to submitting the API function call.

* * * * *